United States Patent
Haravu et al.

(10) Patent No.: US 10,552,071 B1
(45) Date of Patent: Feb. 4, 2020

(54) LAYERED DATA PATH ARCHITECTURE FOR DATA PROTECTION AND MOBILITY

(71) Applicant: EMC IP Holding Company LLC, Hopkinton, MA (US)

(72) Inventors: Nagasimha G. Haravu, Apex, NC (US); Alan L. Taylor, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 119 days.

(21) Appl. No.: 15/798,604

(22) Filed: Oct. 31, 2017

(51) Int. Cl.
*G06F 3/00* (2006.01)
*G06F 3/06* (2006.01)

(52) U.S. Cl.
CPC .......... *G06F 3/0635* (2013.01); *G06F 3/0656* (2013.01); *G06F 3/0667* (2013.01); *G06F 2003/0697* (2013.01)

(58) Field of Classification Search
CPC .... G06F 3/0635; G06F 3/0656; G06F 3/0667; G06F 2003/0697
See application file for complete search history.

(56) References Cited

U.S. PATENT DOCUMENTS

| | | | | |
|---|---|---|---|---|
| 7,386,662 B1* | 6/2008 | Kekre | ................... | G06F 3/0605 711/113 |
| 2007/0297338 A1* | 12/2007 | Mou | ..................... | G06F 11/201 370/242 |
| 2014/0372384 A1* | 12/2014 | Long | ................... | G06F 11/1469 707/679 |
| 2015/0007171 A1* | 1/2015 | Blake | .................. | G06F 9/45537 718/1 |
| 2015/0149587 A1* | 5/2015 | Wang | ...................... | G06F 16/13 709/217 |
| 2016/0019117 A1* | 1/2016 | Kumarasamy | ...... | G06F 11/1417 707/650 |

OTHER PUBLICATIONS

Sathya Krishna Murthy, "Storage Management System and Method," U.S. Appl. No. 15/799,259, filed Oct. 31, 2017 (109217).

* cited by examiner

*Primary Examiner* — Jing-Yih Shyu
(74) *Attorney, Agent, or Firm* — Muirhead and Saturnelli, LLC

(57) ABSTRACT

A data path for each storage object may be customized for the particular services enabled for the storage object. Techniques for determining and using data paths may include: receiving an administrative command on a control path, wherein the administrative command is a request to perform any of enable, disable and modify a data service for a first storage object; determining, in accordance with the administrative command, a modification to be made to a current configuration of a data path for the first storage object in order to implement the administrative command, wherein the current configuration includes a plurality of components forming a call stack invoked in connection with I/O processing for I/Os directed to the first storage object; and modifying the data path in accordance with the modification determined.

20 Claims, 12 Drawing Sheets

LAYERED DATA PATH ARCHITECTURE FOR DATA PROTECTION AND MOBILITY

BACKGROUND

Technical Field

This application generally relates to the data path or I/O (Input/Output) path such as in connection with servicing I/O operations or requests.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. Such data storage systems are provided, for example, by Dell Inc. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of determining and using data paths comprising: receiving an administrative command on a control path, wherein the administrative command is a request to perform any of enable, disable and modify a data service for a first storage object; determining, in accordance with the administrative command, a modification to be made to a current configuration of a data path for the first storage object in order to implement the administrative command, wherein the current configuration includes a plurality of components forming a call stack invoked in connection with I/O processing for I/Os directed to the first storage object; and modifying the data path in accordance with the modification determined. The administrative command may be a request to enable the data service for the first storage object. The current configuration of the data path may include only a first component of layered services. The modification may include adding one or more additional components of the layered services to the data path for the first storage object to enable performing the data service for the first storage object. The one or more additional components may not be included in the data path for the first storage object prior to said modifying. The administrative command may be a request to disable the data service for the first storage object. The current configuration of the data path may include a plurality of components of layered services. The modification may include removing one or more of the plurality of components of the layered services from the data path for the first storage object to disable the data service for the first storage object. The one or more of the plurality of components are removed from the data path for the first storage object by said modifying. The steps of determining and modifying may be performed while a host is issuing I/Os to the first storage object. The data path for the first storage object may be a first data path, and a second data path may be used for processing I/Os issued to a second storage object. The second data path may include a plurality of components forming a second call stack invoked in connection with I/O processing for I/Os directed to the second storage object, and the call stack of components of the first data path for the first storage object may include at least one component that is not included in the second call stack of the second data path for the second storage object. The first data path may be customized in accordance with data services enabled for the first storage object, wherein the second data path may be customized in accordance with data services enabled for the second storage object. A layered services orchestrator may determine components of layered services included in the first data path for the first storage object and the second data path for the second storage object. The call stack of the data path for the first storage object may include one or more components selected from layered services in accordance with data services enabled for the first storage object. The layered services may include an anchor component that is at a top of the call stack and is first invoked in connection with processing client I/O requests directed to the first storage object. The anchor component may be a required component in each data path for each storage object. The layered services may include a transit component that is included in the call stack and configured as a proxy for a remote storage object on a remote system. The transit component may receive I/O requests and translate the I/O requests in accordance with format and semantics of the remote system. The layered services may include a navigator component that is included in the call stack and configured as a target that receives I/Os from another component. The navigator object may also be configured as an initiator of I/Os with respect to two other components whereby the navigator component may be configured to send I/Os to the two other components. The navigator component may forward write I/Os received from the another component to the two other components. A first of the two other components may be designated as a primary and a second of the two other components may be designated as a secondary. The navigator component may perform first processing for a read I/O comprising: determining whether the second component designated as secondary is local with respect to the navigator component whereby the navigator component and the second component are included in a same system; determining whether the second component is able to provide valid requested read data of the read I/O; and responsive to determining the second component is local and also able to provide the valid requested read data of the read I/O, issuing the read I/O to the second component but not the first component. The layered services may include a copier component that is included in the call stack and may be configured to issue read I/Os to a first component and issue write I/Os that write read data received for the read I/Os. The layered services may include an I/O coordinator (IOC) component that is included in the call stack, configured to receive I/Os from two other initiator components, and configured to send I/Os to another target component. The IOC component may forward read I/Os received from the two other initiator components to the another target component. A first of the two other components may be designated as a primary and a second of the two other components may be designated as a secondary. The IOC component may forward write I/Os received from the first component designated as primary to the another target component, and the IOC component may reject write I/Os received from the second component designated as secondary if the write I/Os overwite any region tracked by the IOC component as having already been written in connection with write I/Os received from the first component designated as primary. The layered services may include a zero detection component that is included in the call stack and configured between a single initiator component and a single target component. The zero detection component may perform first processing comprising: determining whether a write operation is a request to write zeroes to a logical address that is not mapped to allocated storage; and responsive to determining the write operation writes zeros to the logical address that is not mapped to allocated storage, tracking that the logical address has zeroes impliedly stored at the logical address without allocating storage for the logical address. The first storage object may be a first logical device, and the first logical device may be one of a plurality of logical devices. Each of the plurality of logical devices may have its own customized call stack including only selected components invoked in accordance with data services performed for said each logical device.

In accordance with another aspect of techniques herein is a system comprising: one or more processors; and a memory comprising code stored thereon that, when executed, performs a method of determining and using data paths comprising: receiving an administrative command on a control path, wherein the administrative command is a request to perform any of enable, disable and modify a data service for a first storage object; determining, in accordance with the administrative command, a modification to be made to a current configuration of a data path for the first storage object in order to implement the administrative command, wherein the current configuration includes a plurality of components forming a call stack invoked in connection with I/O processing for I/Os directed to the first storage object; and modifying the data path in accordance with the modification determined.

In accordance with another aspect of techniques herein is a computer readable medium comprising code stored thereon that, when executed, performs a method of determining and using data paths comprising: receiving an administrative command on a control path, wherein the administrative command is a request to perform any of enable, disable and modify a data service for a first storage object; determining, in accordance with the administrative command, a modification to be made to a current configuration of a data path for the first storage object in order to implement the administrative command, wherein the current configuration includes a plurality of components forming a call stack invoked in connection with I/O processing for I/Os directed to the first storage object; and modifying the data path in accordance with the modification determined. The administrative command may be a request to enable the data service for the first storage object. The configuration of the data path may include only a first component of layered services. The modification may include adding one or more additional components of the layered services to the data path for the first storage object to enable performing the data service for the first storage object, and wherein the one or more additional components may not be included in the data path for the first storage object prior to said modifying. The administrative command may be a request to disable the data service for the first storage object. The current configuration of the data path may include a plurality of components of layered services, and wherein the modification may include removing one or more of the plurality of components of the layered services from the data path for the first storage object to disable the data service for the first storage object. The one or more of the plurality of components may be removed from the data path for the first storage object by said modifying.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
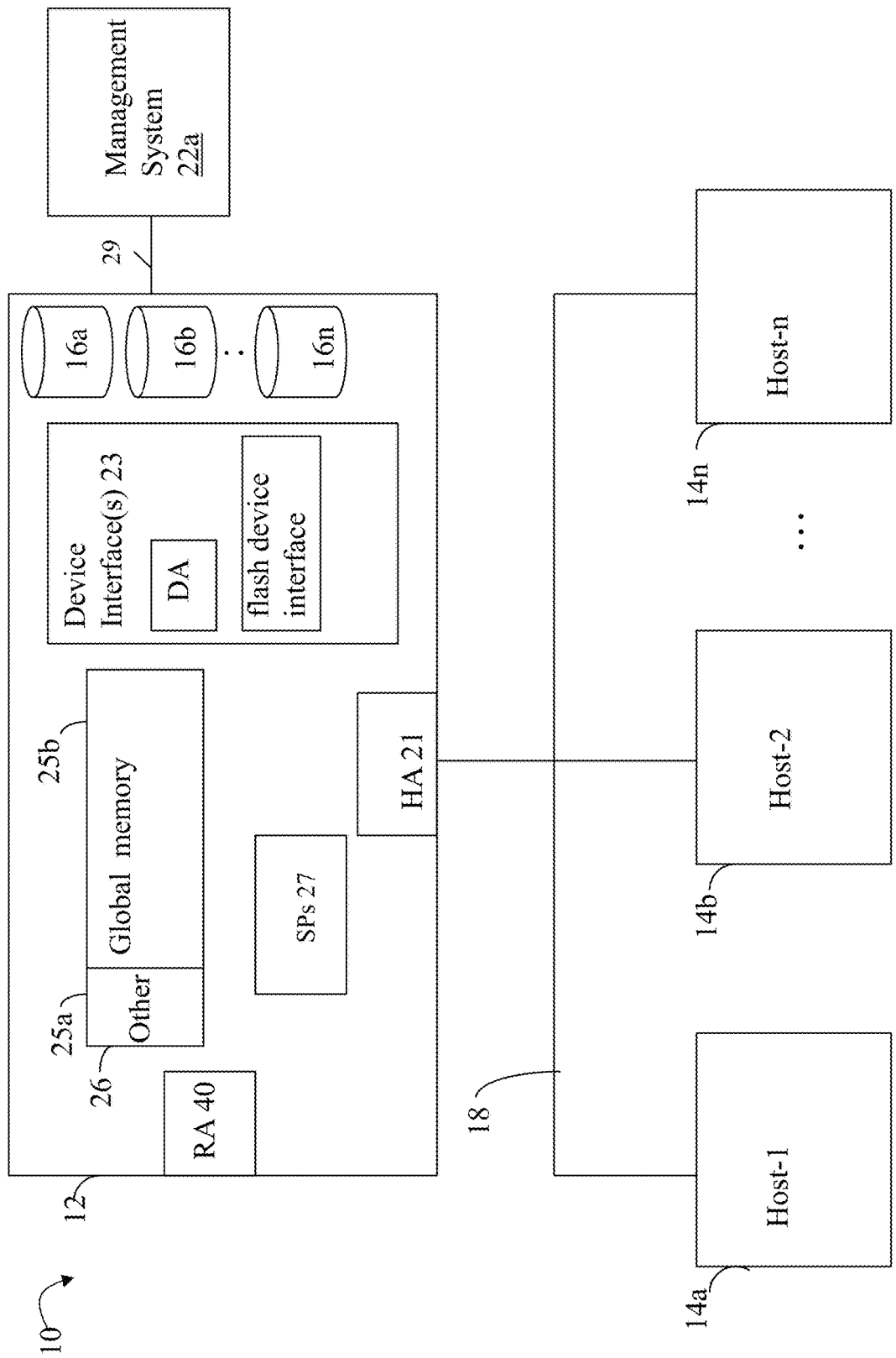
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor, such as by Dell Inc. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by Dell Inc., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2A:
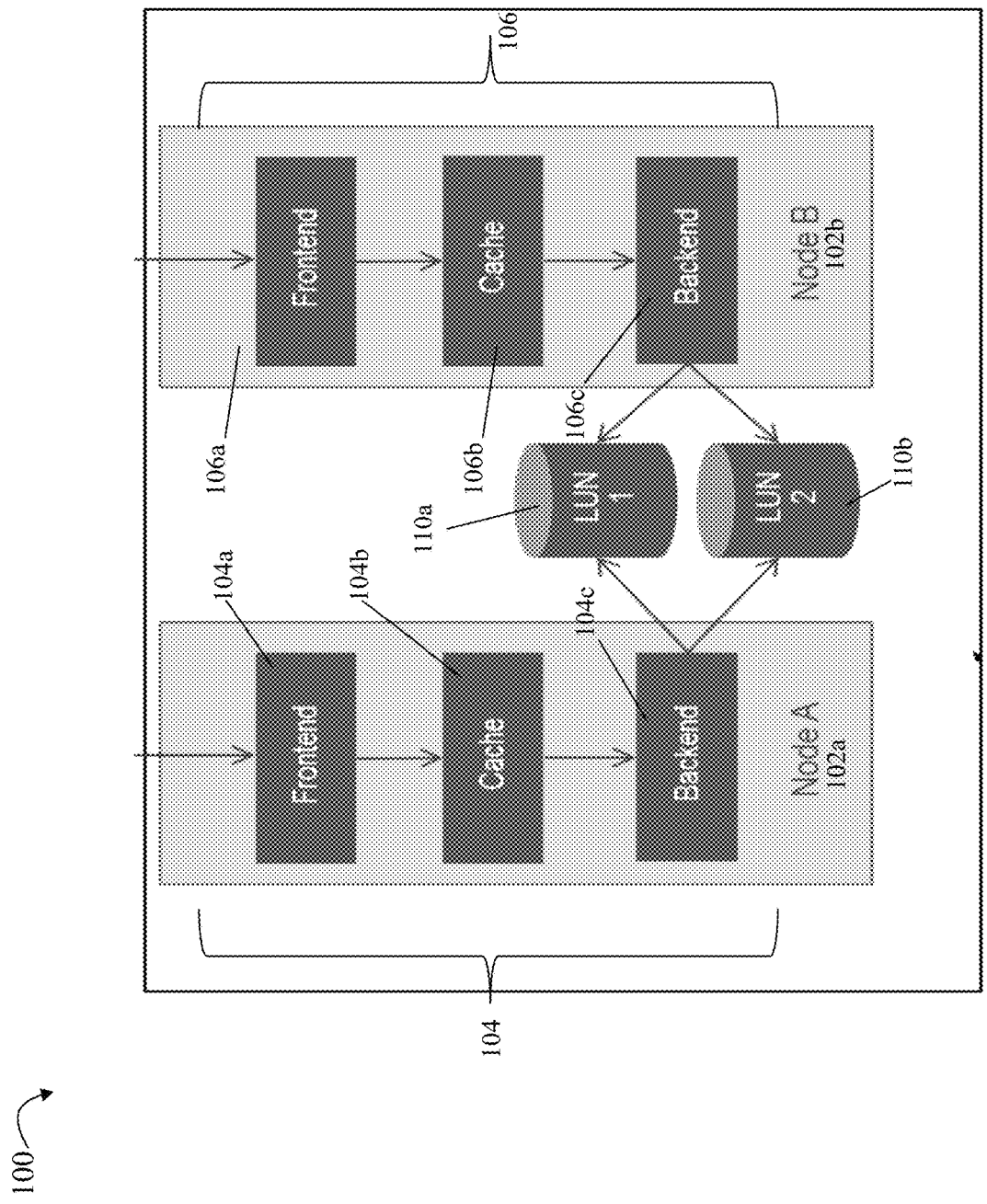
FIG. 2A is an example illustrating a fixed data path call stack in an active-active configuration.

With reference to FIG. 2A, shown is an example 100 illustrating components that may be included in the data path in at least one existing data storage system. The example 100 includes two processor nodes A 102a and B 102b and associated software stacks 104, 106 of the data path where I/O requests may be received by either processor node 102a or 102b. The data path is designed to minimize the latency associated with I/O requests. In the example 100, the data path 104 of processor node A 102a includes a set of fixed components: the frontend (FE) component 104a (e.g., an FA or front end adapter) that translates the protocol-specific request into a storage system-specific request; a cache layer 104b where data is temporarily stored; a backend (BE) component 104c that moves data between the cache and permanent non-volatile storage (e.g., back end physical non-volatile storage devices accessed by BE components such as DAs as described herein). Similarly, the data path 106 for processor node B 102b its own FE component 106a, cache layer 106b and BE component 106c that are respectively similar to components 104a-c. Elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the cache 104b and, at a later point in time, the write data may be destaged from the cache to the physical storage 110a, 110b by the BE component 104c. The write request may be considered complete once the write data has been stored in the cache whereby an acknowledgement regarding the completion may be returned to the host (e.g., by component 104a). In connection with a read operation, a determination is made as to whether the requested read data is in cache 104b whereby a cache hit is determined. If the requested read data is in cache, the read data is retrieved from the cache 104b and returned to the host. Otherwise, if the requested read data is not in cache 104b, the requested data is read by the BE component 104c from the backend storage 110a, 110b and stored into the cache 104b. The read data may be retrieved from the cache 104b and then returned to the host.

In connection with techniques herein, an additional layered services architecture layer is introduced into the data paths 104, 106 of FIG. 2A. The layered services enable unification of data protection and mobility activities. Data protection may refer, for example, to services such as replication. Mobility may refer to the ability to move objects and associated tasks between different data storage systems, components, and appliances. The layered services architecture described herein enables unification of the foregoing data mobility and protection whereby components may be dynamically selected and inserted into the data path in accordance with the particular storage object and whereby the components inserted each offer varying capabilities and processing.

Following paragraphs disclose additional details regarding the layered services and associated approach whereby different components of the architecture of the layered services may be uniquely and dynamically inserted, as needed, on an object-by-object basis. In other words, the layered services includes a customized and variable set of one or more components included in the data path where such components are dynamically determined and selected based on the particular service, task or operations performed with respect to the particular storage object (e.g., LUN, file, file system, etc.). Techniques herein utilize an approach that achieves separation of the components that offer data path services (e.g., replication, snapshot, or other data protection service) from the storage objects (e.g., LUN, file system, file) configured to consume such services. In at least one embodiment in accordance with techniques herein, a specialized orchestrator module within the data path is used. In following description, the orchestrator module may be referred to as the layered services orchestrator (LSO). The LSO encapsulates the logic for separating the data path services from the objects (e.g., objects representing LUNs or other storage entities in the data storage system configuration) configured to consume such services. The foregoing and other aspects of techniques herein are described in more detail below.

Figure 2B:
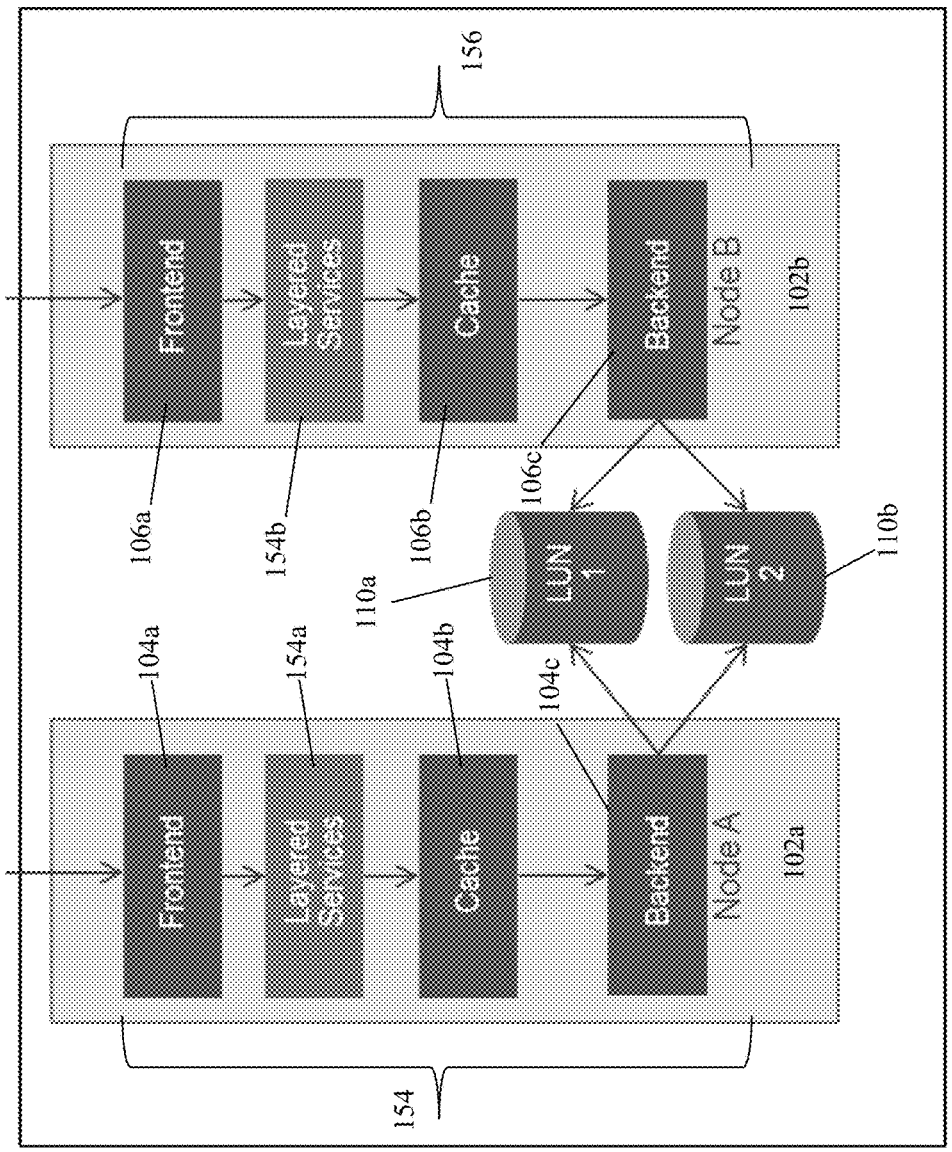
FIGS. 2B and 4 are examples illustrating a data path call stack in an active-active configuration including layered services in an embodiment in accordance with techniques herein.

With reference to FIG. 2B, shown is an example illustrating components that may be included in the data path in an embodiment in accordance with techniques herein. The example 150 includes components similar to those as illustrated in FIG. 2A with the difference that the layered services 154a, 154b has been added to each of the data path call stacks 154, 156. Elements 154 and 156 denote data paths and are respectively similar to elements 104 and 106 of FIG. 2A with the respective addition of layered services 154a and 154b. As illustrated, layered services 154a is introduced into the data path call stack 154 between the FE component 104a and the cache layer component 104b; and layered services 154b is introduced into the data path stack 156 between the FE component 106a and the cache layer component 106b. Traditionally in systems without using techniques herein without the layered services architecture as described herein, the data path includes the same set of components for all I/Os processed. In the example 150, layered services 154a, 154b appears as a fixed component. However, within the layered services 154a and 154b, components are dynamically added or removed from the I/O stacks 154, 156 for the particular individual storage object to which an I/O is directed. Thus, within the layered services 154a and 154b, the particular components which are actually invoked and dynamically included in a runtime instance (e.g., call chain) of the data path varies with the particular service or task performed on the storage object. In at least one embodiment as described in following paragraphs, the layered services 154a and 154b each include a bootstrap fixed component (e.g., referred to as the anchor component in following description and examples) which decides whether additional components are to be injected or dynamically included in the runtime call chain or stack of components forming the data path. Thus, in an embodiment in accordance with techniques herein, data paths vary with the particular storage objects where each such data path may include a different runtime call chain or stack of components. The foregoing variable data path customized for a particular storage object and services enabled for that storage object may be contrasted with the traditional data path having a fixed stack where a same set of modules or components may be invoked in each storage object's data path. In contrast, techniques herein provide for dynamically determining at runtime the particular components in the varying, customized data path call stack where the components included in each instance vary with the storage object and services or operations performed for that storage object.

Figure 3:
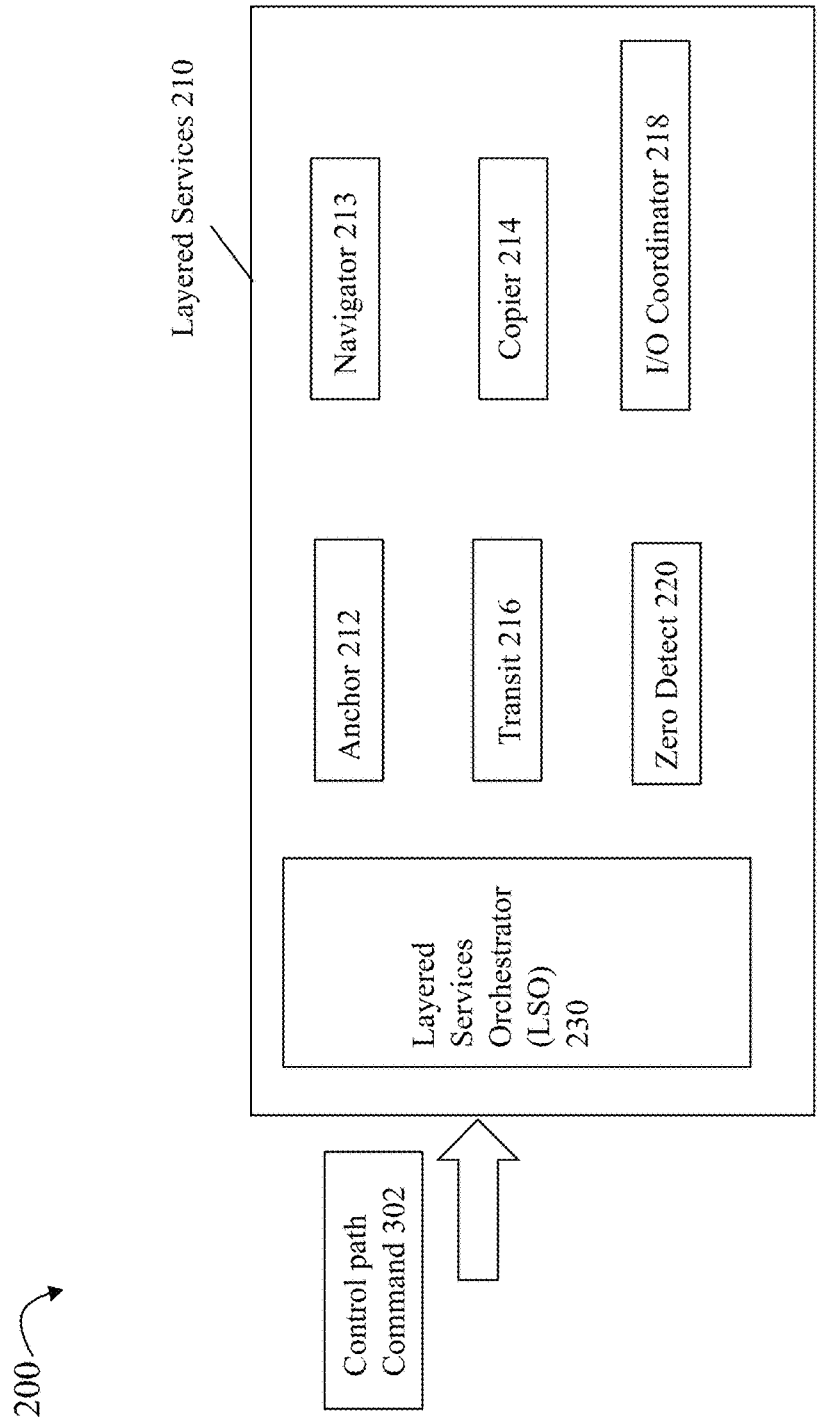
FIG. 3 is an example illustrating components of the layered services 210 that may be used in an embodiment in accordance with techniques herein.

Referring to FIG. 3, shown is an example 200 of components of the layered services 210 in an embodiment in accordance with techniques herein. The layered services 210 may include the following modules or components: layered services orchestrator (LSO) 230, anchor 212, navigator 213, transit 216, copier 214, zero detect 220, and I/O coordinator 218. Generally, the LSO 230 is an administrative component that is not part of the data path or I/O path runtime call stack of components associated with a storage object. The anchor 210 is the component at the top of each layered services stack for any/all storage objects. The anchor 210 is mandatory and required for each data path call stack and offers a fixed target component for receiving I/O requests from the FE component (e.g., 104a, 106a as in FIG. 2B). The remaining five (5) components 213, 214, 216, 218 and 220 may be optionally included in the data path call stack of a particular storage object depending on the particular data services enabled for the storage object. In the simplest or basic case, the data path call stack for a storage object, such as a LUN, may include only the anchor component 212. Thus, for example, with reference back to FIG. 2B, the layered services 154a of the LUN's data path runtime stack 154 and the layered services 154b of the LUN's data path runtime stack 156 would include only the anchor 221 (e.g., 154a and 154b each only include the anchor 212). At a later point in time, the data path run time stack for the LUN may be modified, for example, to include one or more additional ones of the components 213, 214, 216, 218, 220 where the particular components and their placement or order in the data path call stack varies with the particular one or more services enabled with respect to the particular LUN.

As noted above, the LSO 230 is an administrative component that is not part of the data path or I/O path runtime call stack (e.g. not included in 154, 156) of components associated with a storage object. Rather the LSO 230 may receive control path commands affecting the data path and associated call stack of a storage object. For example, the LSO may receive a control path command to enable, disable, or otherwise modify an existing data service for a LUN. For example, the LSO may receive a control path command to enable synchronous remote replication for LUN 1, to enable asynchronous remote replication for LUN 2, and the like. In response, the LSO may perform processing to determine the appropriate one or more other components needed for the newly added/enabled service and accordingly modify the existing data path call stack.

Figure 4:
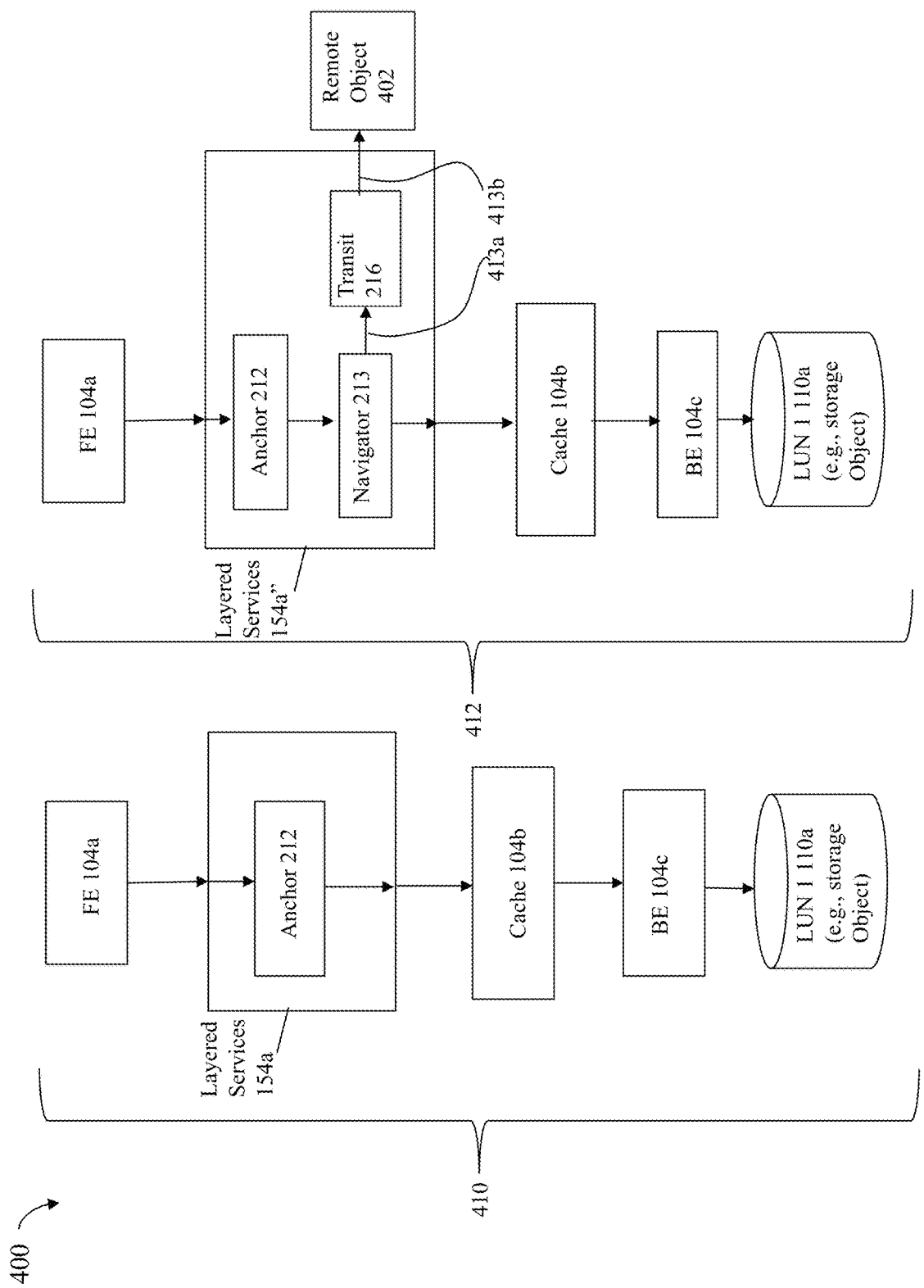

For example, reference is made to the example 400 of FIG. 4. Element 410 illustrates the data path call stack at a first point in time for LUN 1 where the layered services 154a may include only the anchor 212. Subsequent to the first point in time, a data service may be enabled for LUN 1 110a by issuing one or more suitable administrative commands (e.g., element 302 in FIG. 3) over the control path. For example, the data service enabled may be the synchronous remote copy data service that creates and maintains a synchronous remote copy of LUN 1, whereby the remote copy of LUN 1 may be a bit for bit physical copy or mirror of LUN 1 at a remote data storage system or site. The original primary copy of LUN 1 110a is maintained on a first or primary data storage system where the synchronous remote copy data service creates and maintains a remote object 402 as the remote copy that is a synchronous mirror of LUN 1 110a.

As known in the art, in connection with a synchronous copy, writes to the primary LUN 1 110a, are mirrored on the remote copy 402. Processing associated with a write to LUN 1 110a have a remote synchronous copy of mirror includes: writing the write data to the cache 104b (write data is later destaged by BE 104c to the physical storage provisioned for LUN 1 110a); transmitting the write data to the remote data storage system or site; storing the write data in the cache of the remote data storage system (where the write data is later destaged to the physical storage allocated on the remote data storage system for the remote mirror of LUN 1 402); returning an acknowledgement from the remote to the primary data storage system regarding completion of the write to the remote mirror of LUN 1 402; and returning an acknowledgement regarding completion of the write from the primary data storage system to the host. With writes in connection with the synchronous remote copy, an acknowledgement regarding completion of the write is returned to the host once the primary system receives the acknowledgement form the remote system regarding completion of the write on the remote system. The foregoing ensures that the primary copy of LUN 1 110a and the remote copy of LUN 1 402 are maintained as synchronous mirrors for each write.

With reference back to FIG. 3, the one or more control path commands to enable the above-noted synchronous remote copy data service may be received by the LSO 230 which performs processing to determine the appropriate components to include in the data path call stack. Responsive to receiving the control path command(s) 302, the LSO 230 determines that additional components need to be inserted into the data path call stack as illustrated by layered services 154a". Thus, element 412 illustrates the data path call stack for the LUN 1 110a at a second point in time subsequent to enabling the above-noted synchronous remote copy data service for LUN 1 110a. In this example at the second point in time, the layered services 154a" of the data path call stack 412 includes the anchor 212, the navigator 213, and the transit 216. The different capabilities or functionalities of the components 212, 213, 216 and other of the layered services 210 are described in more detail in following paragraphs. Additionally, the particular selected components 212, 213 and 216 included in 154a" in connection with the synchronous remote copy data service are described in more detail in following paragraphs.

At a third point in time, one more additional control path commands may be received by the LSO 230 which disable the above-noted synchronous remote copy data service for LUN 1 110a. In response, the LSO 230 may determine a further revised data path call stack for LUN 1 110a. In this example, the LSO 230 may perform processing to return the data path call stack for LUN 1 110a back to the call stack as illustrated in 410.

With reference back to FIG. 3, the 5 components 213, 214, 216, 218 and 220 may be characterized in one aspect as building blocks or basic atomic components that may be selectively included and arranged in a particular calling sequence in the data path in accordance with the particular service(s) enabled for a LUN. Thus, generally, the anchor 212 is the single component of the layered services required in a data path and zero or more instances of the 5 components (e.g., 213, 214, 216, 218 and 220) may be included in the data path as needed depending on services enabled for the LUN. Although not illustrated, the same component may be included multiple times in the data path stack for a LUN or other storage object. Thus, the particular components of the layered services 210 and well as their particular runtime call sequence or chain(s) vary with, and depend on, the particular service(s) enabled for each storage object.

The LSO 230 adds or removes components (from the layered services) of the data path stack in a non-disruptive manner. In at least one embodiment in accordance with techniques herein and with reference to FIG. 2B, two separate instances of the data path call stack may be maintained with one instance on each of the processor nodes 102a and 102b. In such an embodiment, the LSO configures two instances of 412 of FIG. 4, one for each of the processor nodes 102a, 102b. In such an embodiment, processing performed by LSO 230 includes determining the updated or modified data path call stack and then implementing the updated or modified data path call stack for use with the LUN in a non-disruptive manner. For example, with reference back to the example above in connection with FIG. 4, the LSO 230 may receive the control path commands to enable the synchronous remote copy data service. The LSO 230 may communicate with the anchor component to temporarily hold or pause any newly received I/Os (e.g., client or host I/Os received by the anchor 212 for processing) directed to the LUN 1 110a, such as by placing the I/Os in a queue or buffer. Additionally, any pending or in-progress I/Os may be completed or drained. Any copying performed by configured components of the layered services portion of the data path call stack may be suspended. (Such copying may be performed, for example, by the copier component 214 as described in more detail elsewhere herein). The LSO 230 may then determine the modified data path call stack, insert the necessary components into the data path call stack, and then restart or resume processing I/Os whereby the I/Os in the queue or buffer (and any subsequently received I/Os directed to the LUN) are processed. Additionally, any copying performed by a layered services component, such as the copier component 214, may be resumed.

It should be noted that the LSO 230 may use any suitable mechanism for performing processing as described herein. For example, at least one embodiment of the LSO 230 may use a rules engine to determine the particular components, calling sequence or chain, parameters, and the like, to use for each data service. The LSO 230 is the common interface used to dynamically and selectively determine the data path call stack for multiple different storage objects of any type. For example, the LSO 230 may be used to enable synchronous replication for LUN 1 110a as described above whereby a first data path call stack may be used for LUN 1 110a. The LSO 230 may be used to enable a different data service for LUN 2, 110b whereby a second different data path call stack (different from 412) may be used for LUN 2 110b. Thus, the LSO 230 determines the different customized data path call stacks for the two LUNs 110a, 110b where the different control path commands for each of the two LUNs 110a, 110b are received and processed by the LSO 230.

Figure 5:
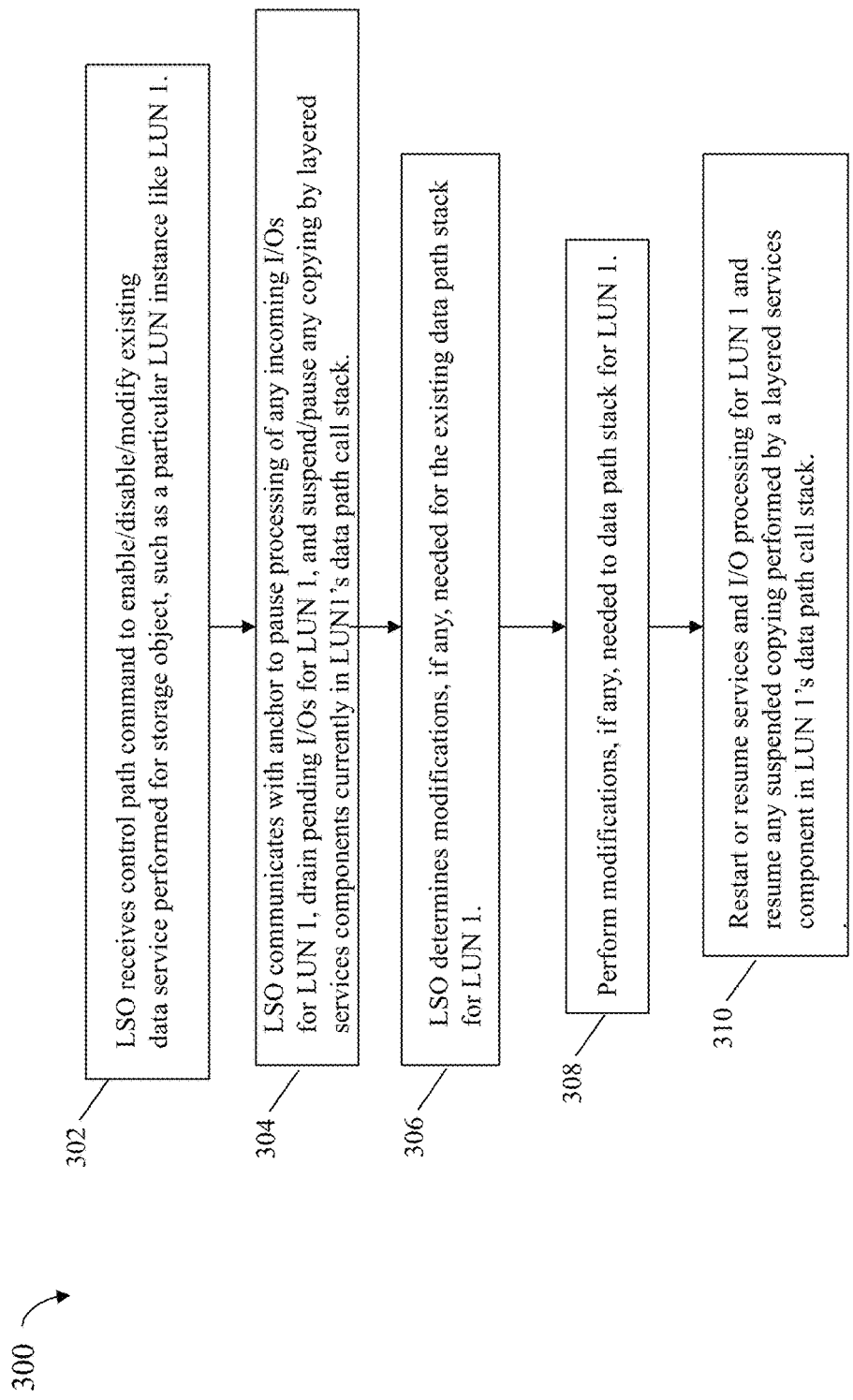
FIG. 5 is a flowchart of processing steps that may be performed in an embodiment in accordance with techniques herein.

Referring to FIG. 5, shown is a flowchart of processing steps that may be performed in an embodiment in accordance with techniques herein. The flowchart 300 summarizes processing described above in connection with the LSO 230 to determine the particular components of the layered services to include in the data path for a particular storage object, such as a particular LUN instance. At step 302, LSO receives one or more control path commands to enable a new data service for a storage object, disable a data service for a storage object, or modify an existing data service currently performed for a storage object. The storage object may be, for example, as a particular LUN instance such as LUN 1. From step 302, control proceeds to step 304. In step 304, the LSO communicates with the anchor component of LUN 1's data path to pause processing of new incoming I/Os for LUN 1. Additionally, step 304 may include draining any inflight or pending I/Os whereby such pending I/Os may be allowed to complete. Step 304 may also include suspending or pausing any copying performed by a layered services component, such as the copier component 214. From step 304, control proceeds to step 306. Step 306 may include the LSO determining what modifications, if any, are needed for the existing data paths call stack for LUN 1. From step 306, control proceeds to step 308 where the modifications, if any, (determined in step 306) are implemented in the data path call stack for LUN 1. From step 308, control proceeds to step 310. Step 310 may include restarting or resuming I/O processing for LUN 1. Additionally in step 310, any copying performed by a layered services component, such as the copier component 214, may be resumed.

With reference back to FIG. 3, following paragraphs will now describe the remaining components 213, 216, 214, 218 and 220 of the layered services 210 in more detail. The components in the layered services have the role of either an initiator of an I/O request, a target of I/O request, or both. A component that is a target receives incoming I/Os initiated or originating from another component. A component that is an initiator sends out, transmits or issues I/Os to another component. Directional arrows, such as in FIG. 4, denote the runtime data path call chain flow between components of the layered services such as 154a". For example, an incoming arrow 413a to a component such as transit 216 indicates that transit 216 receives I/Os (is a target invoked by another component) with respect to I/Os from the navigator 213. An outgoing arrow 413b from a component, such as transit 216, indicates that transit 216 is an initiator of I/Os as well. It should be noted that with components of the layered services, an initiator of write requests provides for a write data flow in the same direction as the write request (e.g., write data from initiator to another component). An initiator of read requests provides for a read I/O request data flow in a first direction whereby the requests are issued from the initiator to another component and whereby read data is returned in a data flow opposite that of the read I/O request data flow (e.g., read data returned from the another component to the initiator).

It is noted that the anchor 212 is always an initiator of I/O requests since anchor 212 forwards I/O requests. If no other components of the layered services are configured for use in a data path call stack, the anchor component simply forwards I/O requests to the cache. Otherwise, anchor 212 forwards the I/O requests to the next component of the layered services configured in the data path call stack.

The transit component 216 acts as a proxy for a storage object on a remote system. Generally, the transit component 216 receives I/O requests in an input format specifically used by the data path call stack and translates or maps the input format to a suitable output format for use on the remote system. For example, consider the case for the synchronous copy data service as described in connection with FIG. 4, the transmit component 216 of 154a" may take as an input an I/O request used on the local or primary data storage system of LUN 110a and translate the I/O request into an output suitable for use on the remote data storage system storing the remote object 402, which is the remote synchronous copy or mirror of LUN 1 110a. Such translating may include generating an output I/O request that conforms to semantics and format for I/O requests of the remote data storage system. Such translating may include, for example, remapping parameters, translating the input format to a suitable output format, invoking a suitable API (application programming interface) as used by the remote system, and the like.

The navigator component 213 serves as a target of another component (e.g. is invoked in the data path by another component with an I/O request for processing), and serves as an initiator for exactly two other components (e.g., initiates or issues I/O requests to two other components). For example, as illustrated by navigator 213 of FIG. 4, there is a single incoming arrow (indicating navigator receives I/O requests for processing from another initiator component) and two outgoing arrows to two other target components. The two target components are marked as either local or remote, as well as either primary or secondary. When navigator receives a write request, it forwards the request to both of its targets whereby write data is sent from the navigator to each of its targets. In connection with reads, read data is returned up the data path call stack whereby read data may be received by the navigator from both of its target components. Thus, in connection with reads, the navigator may forward the read request for processing by either of its two targets. One of the two targets may be designated as primary and the other designated as secondary. The primary target denotes the source or primary copy of the data. The secondary target denotes the destination or secondary copy of the data. Additionally, each target may be local (e.g., included in the same data storage system as the data path call stack) or remote. Thus, in connection with having synchronized mirrors such as with the synchronized copy data service of FIG. 4, a primary LUN may be initially copied to the secondary or destination LUN (e.g., such as a background initial synchronization process) along with any writes subsequently received during and after the initial synchronization. In connection with the example of FIG. 4, the synchronized copy service has the local data storage system with the primary LUN and the remote data storage system as the destination with the secondary copy of the LUN whereby the data is pushed from the source local system to the destination remote system. While the initial copying of the LUN is performed (e.g., until the local and remote LUN copies are synchronized) there may be portions of the LUN data which are not available on the secondary copy on the remote system. The navigator may track which portions of the LUN address space of local and remote copies have been synchronized and which have not. Thus, the primary copy of the LUN data (which is also local in this case) is the data source of the copy, and the secondary copy of the LUN data is the destination of the copy operation (which is also the remote system). By default, read requests may be forwarded to the one of the two targets designated as the primary. In the foregoing example with a data push, the primary target is also local. However, in connection with other data services, the primary target may not be local (e.g., may be remote). For example, consider a data pull operation where data is being copied from a remote source data storage system to the local data storage system which is now the destination of the copy operation. In this case with a data pull, the remote data storage system has primary data copy and the local data storage system has the secondary data copy. In the case where the primary is also remote (as with a data pull), the navigator may be configured to optionally read from the local secondary when possible. For example, as noted above, processing may be performed to synchronize the local secondary copy of a LUN with its primary remote copy of the LUN whereby, during such synchronization, not all the LUN data is available for reading from the local secondary copy. For example, a first portion of the logical address space may have its data already copied from the remote primary LUN to the local secondary LUN. However, the LUN data for the remaining portion of the LUN's address space has not yet been copied from the remote primary LUN to the local secondary LUN. In this case, reads directed to the first portion of the logical address space may be serviced using the local secondary LUN and reads directed to the uncopied remaining portion of the address space are serviced using the remote secondary LUN. Thus, by default, read requests may always be forwarded to the primary. However, if the primary is remote, the navigator may be configured to optionally read from the local secondary within specific address ranges where such data is currently available on the local secondary target. In at least one embodiment, the read request with a navigator may be forwarded for processing on only one of the two targets where the intent is to read from the local where possible. If one of the targets is designated as both local and primary, the read is sent on this one target. However, if a first of the targets is designated as local and secondary, and a second of the targets is designated as remote and primary, then issue the read request on the first target if the secondary includes valid current data; otherwise issue the read request on the second target (remote and primary). (e.g., If local is secondary and remote is primary, then may optionally read from remote if local secondary copy is not accurate (cannot supply the correct required valid data)).

Figure 6:
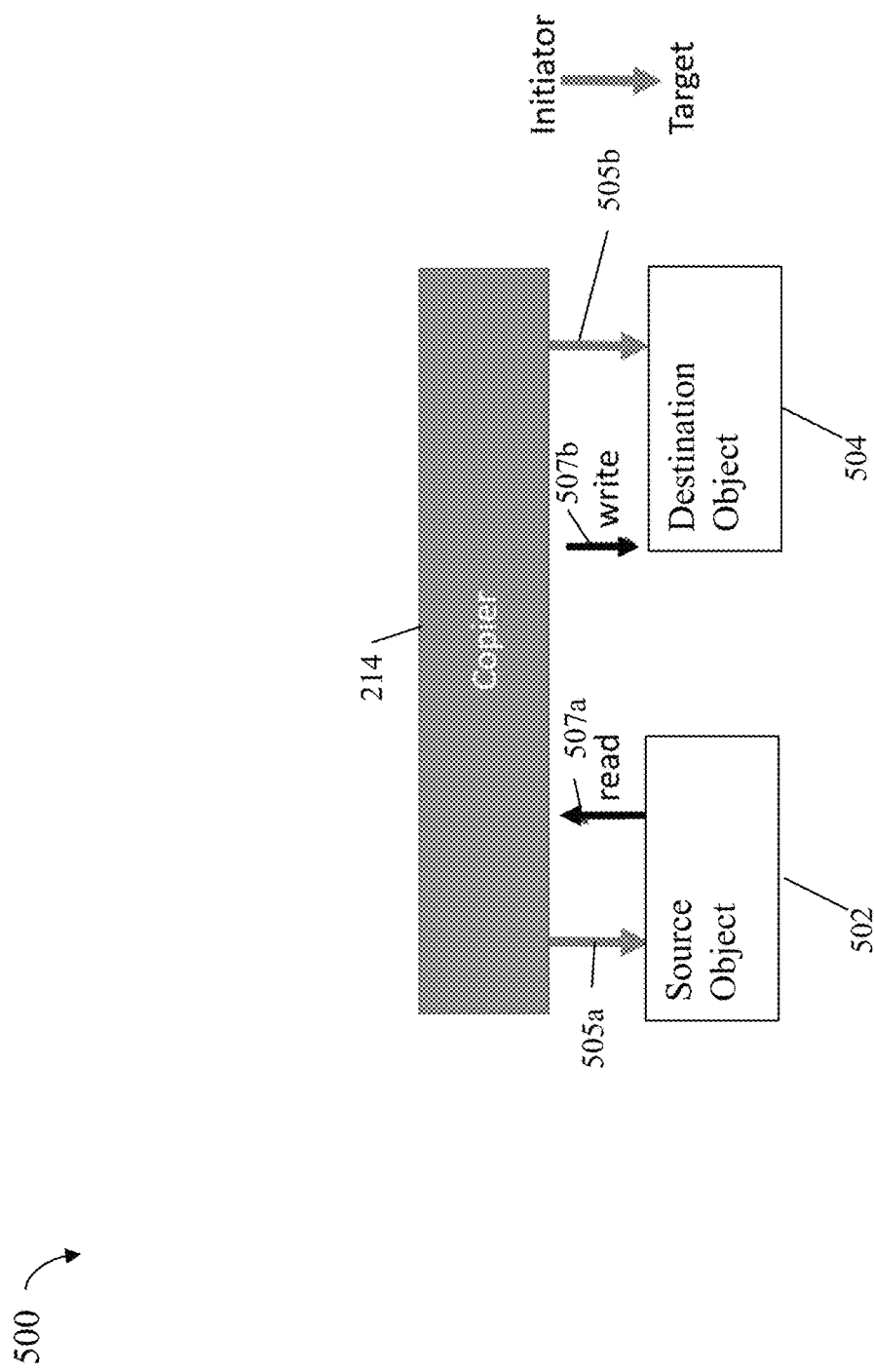
FIGS. 6 and 7 are examples illustrating a copier component in an embodiment in accordance with techniques herein.

The copier component 214 is an initiator-only component of I/Os in the layered services (e.g., the copier component only has outgoing arrows with respect to I/O requests of the data path call stack). In other words, in the data path call stack, no component invokes or calls into the copier to process I/Os, but the copier invokes (e.g., issues I/O requests) to two targets in the data path call stack. With reference to the example 500 of FIG. 6, generally, copier 214 is an originator or initiator of I/O requests where the copier issues 505a read requests to a source object 502 (e.g., source volume or LUN) and issues write requests 505b to a destination object 504 (e.g., destination volume or LUN). Copier requests and receives read data 507a from the source object (via read requests to the source object) where the read data is then returned to copier and written 507b via the write requests to the destination object. Thus, arrows 507a, 507b denote directional arrows with respect to LUN data flow and arrows 505a, 505b denote arrows with respect to I/O requests issued between components of the data path call stack at runtime.

In connection with subsequent examples, the destination object 504 and source object 502 may be located on different data storage systems. In such a case, one of the objects 502, 504 may be denoted on the local data storage system using a proxy, such as the transit component 216 described elsewhere herein.

Figure 7:
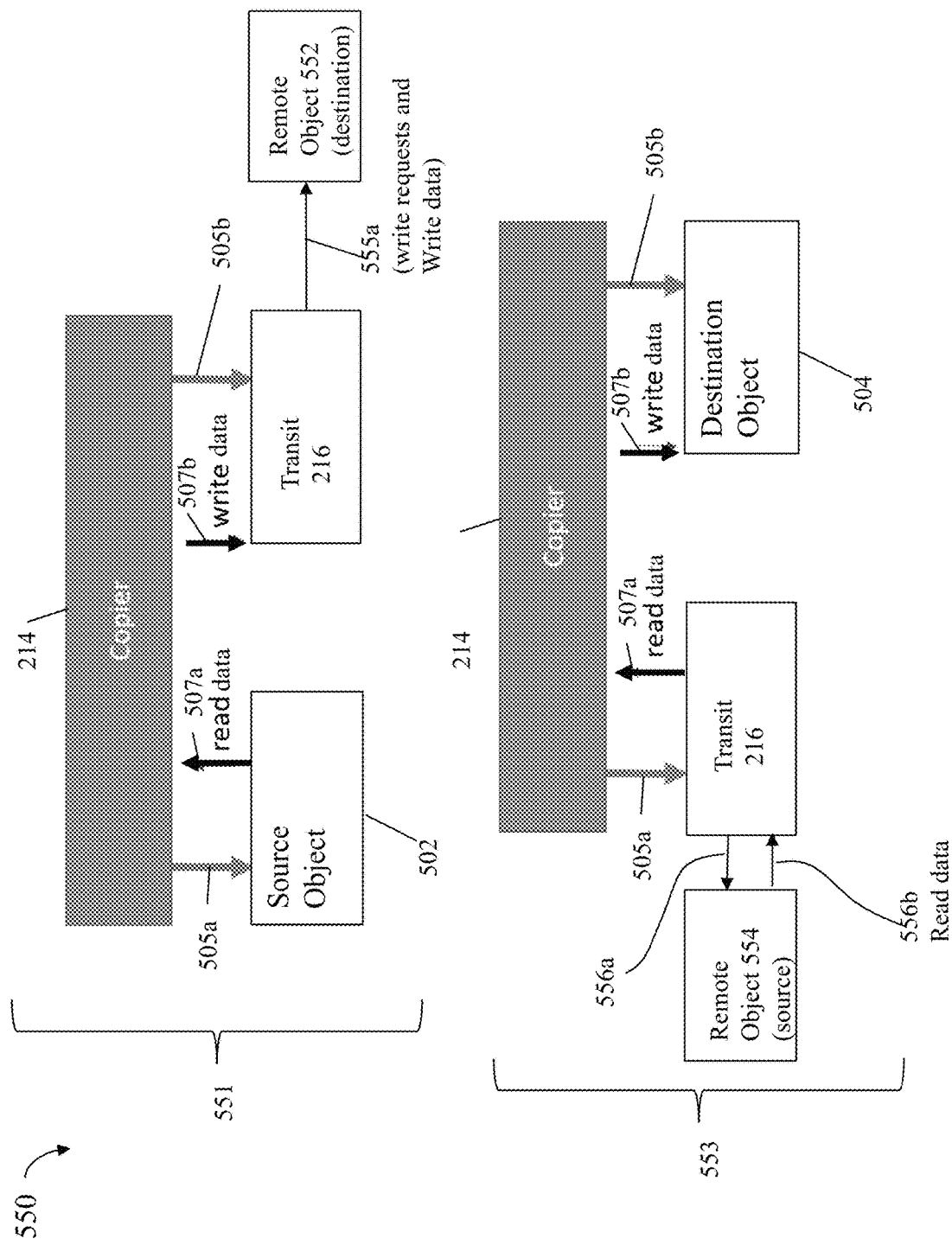

For example, with reference to FIG. 7, element 551 illustrates the case where the destination object is remotely located with respect to the source object 502 and the copy processing is performed on the local system including the source object 502, such as with a data push from the local to the remote system. Element 552 denotes the remote destination object (to where data is copied). Element 555a denotes the arrow illustrating both the flow of write data and also write requests between components. Transit 216 of 551 denotes the transit component instance acting as proxy on the local data storage system for the remote destination object 552.

Also in FIG. 7, element 553 illustrates the case where the source object is remotely located with respect to the source object 502 and the copy processing is performed on the local system including the destination object 504, such as with a data pull operation with data being pulled from the remote to the local system. Element 554 denotes the remote source object (from which data is copied from). Element 556a denotes the arrow illustrating the flow of read I/O requests between components. Element 556b denotes the arrow illustrating the flow of read data between components (read data being returned back through the data path call stack). Transit 216 of 553 denotes the transit component instance acting as proxy on the local data storage system for the remote source object 554.

The I/O Coordinator (IOC) 218 is configured with two initiators of I/Os (e.g., sources of incoming I/Os) and a single target object (e.g., to which the IOC issues I/O requests). One of the initiators is configured as the primary, and the other as secondary. Read requests from either initiator is simply passed down to its target. Write requests from the primary initiator are always passed down to the target, and its write regions (e.g., the particular logical address space portions written to by issuing write requests to the primary initiator) are tracked by the IOC. A write request from the secondary initiator is rejected if such write request overlaps with any regions that are tracked by the IOC as having already been written by a write request issued from the primary initiator. Thus, the IOC may be used in connection with two writers (writes from two initiators) to the same target, such as the same LUN. From the perspective of the IOC, the IOC is configured as the arbiter that decides which initiator "wins" (e.g., is performed) in the event that writes are issued from both the initiators to the same region. For example, a first write may be issued from the primary initiator to the IOC and a second write may be issued from the secondary initiator to the IOC where both the first and second writes write to the same logical address of a LUN (e.g., first and second writes from the two initiators are conflicting writes to the same logical address of the LUN). In the foregoing case, the IOC is configured so that the primary initiator write is performed (e.g., always "wins") and the secondary initiator write is always rejected.

The zero detect component 220 is inserted between a single initiator and a single target and detects if a block of zeroes are written to an unallocated region. In such a case where a write is performed to write a block of zeroes, the zero detect component prevents allocating storage unnecessarily. In one aspect, the zero detect component 220 may be viewed as performing an optimization whereby, rather than allocate storage and write out the block of zeroes, the component 220 may perform alternative processing that simply tracks that the logical address space of the write to the unallocated region has all zeroes stored therein. For example, the component 220 may be a table or list of logical address ranges where a data values of zero is impliedly stored in such regions. Such zeroed logical address ranges of the table or list are unallocated whereby they are not associated with or mapped to allocated storage. Thus, component 220 may be used as a storage optimization and additionally reduces processing time and management associated with any avoided storage allocations. For example, the component 220 may be used in connection with thin or virtually provisioned LUNs. Thin or virtually provisioned LUNs are known in the art whereby physical storage may be allocated "on demand" the first time there is a write issued to a portion of the logical address space. Storage may be allocated in slices or chunks of a specified size that is then mapped to a portion of the logical address space of a LUN. With thin or virtually provisioned LUNs, no physical storage may be initially allocated or provisioned when the thin LUN is created. Storage for the thin LUN is provisioned in slices or chunks as data is written to different logical addresses of the thin LUN's logical address space. Thin LUNs may be contrasted with thick LUNs where physical storage for the entire thick LUN logical address space is allocated or provisioned when the thick LUN is first created. Thus, when writing to a target logical address of a thin LUN for the first time and the write stores all zeroes to the target logical address, the component 220 may be used as an optimization as just described.

What will now be described are various layered services examples illustrating how components of the layered services may be configured in a data path for different use cases. The examples in following figures do not include all components of the data path call stack for simplification of illustration.

Figure 8:
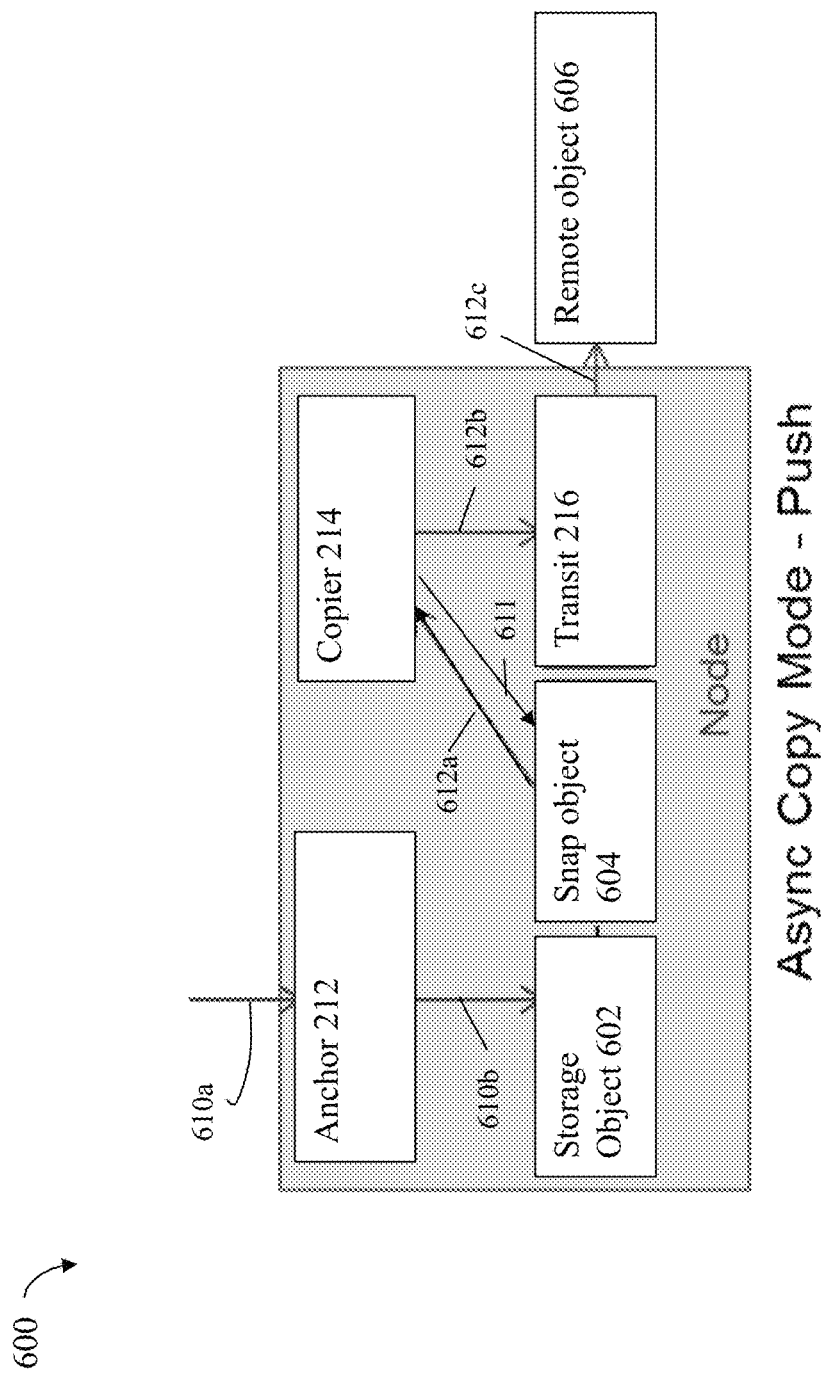
FIGS. 8, 9, 10 and 11 are examples illustrating different components of the layered services that may be configured for different data services for a storage object in an embodiment in accordance with techniques herein.

Referring to FIG. 8, shown is an example 600 illustrating use of techniques herein in connection with selected components of the layered services configured for the data service of asynchronous replication using a data push model between a local storage object 602, such as LUN, and a remote storage object 606, such as a remote copy of the LUN. With asynchronous replication, the remote storage object denotes a point in time physical copy of the local storage object. However, due to the asynchronous aspect, the local and remote copies are not exact mirrors of one another and do not denote the same point in time copies. Thus, the local storage object represents the current point in time copy of the LUN, and the remote object represents a copy of the LUN from a previous point in time.

The example 600 includes anchor 212, local storage object 602, snap object 604, remote object 606, copier 214 and transit 216. The snap object 604 may denote the snapshot taken of the storage object 602 where the snap object 604 may be treated, with respect to techniques herein, as representing another storage volume or LUN. When asynchronous replication is configured between a local storage object 602 and an object 606 on a remote system, snapshots 604 of the local object 602 are taken on the local system and its contents are transmitted 612c to the remote system including the remote object 606. As illustrated in the example 600, layered services are leveraged to insert a copier 214 in the stack to read from the snap object 604 and use a transit object 216 to copy data to the remote object 606. Arrows 610a, 610b denote the host I/O flow as a result of read and write I/Os received from the host. Element 611 denotes the copy I/O flow of read I/Os issued from 214 to 604 whereby the returned read data flow is illustrated by 612a. Element 612b denotes the flow of write I/O requests and thus write data from the copier 214 to transit 216. Element 612c denotes the data flow from transit 216 to the remote object 606. Elements 612a-c denote data flow associated with copy I/Os initiated by the copier 214. The copier 214 as illustrated in the example 600 is consistent with the I/O request flow and data flow as described elsewhere herein in connection with element 551 of FIG. 7.

With asynchronous replication, a host write to the local storage object 602 is acknowledged once the write data has been stored in the cache of the local system. Subsequently, the write data is transmitted to the remote system and applied to the remote object 606.

Figure 9:
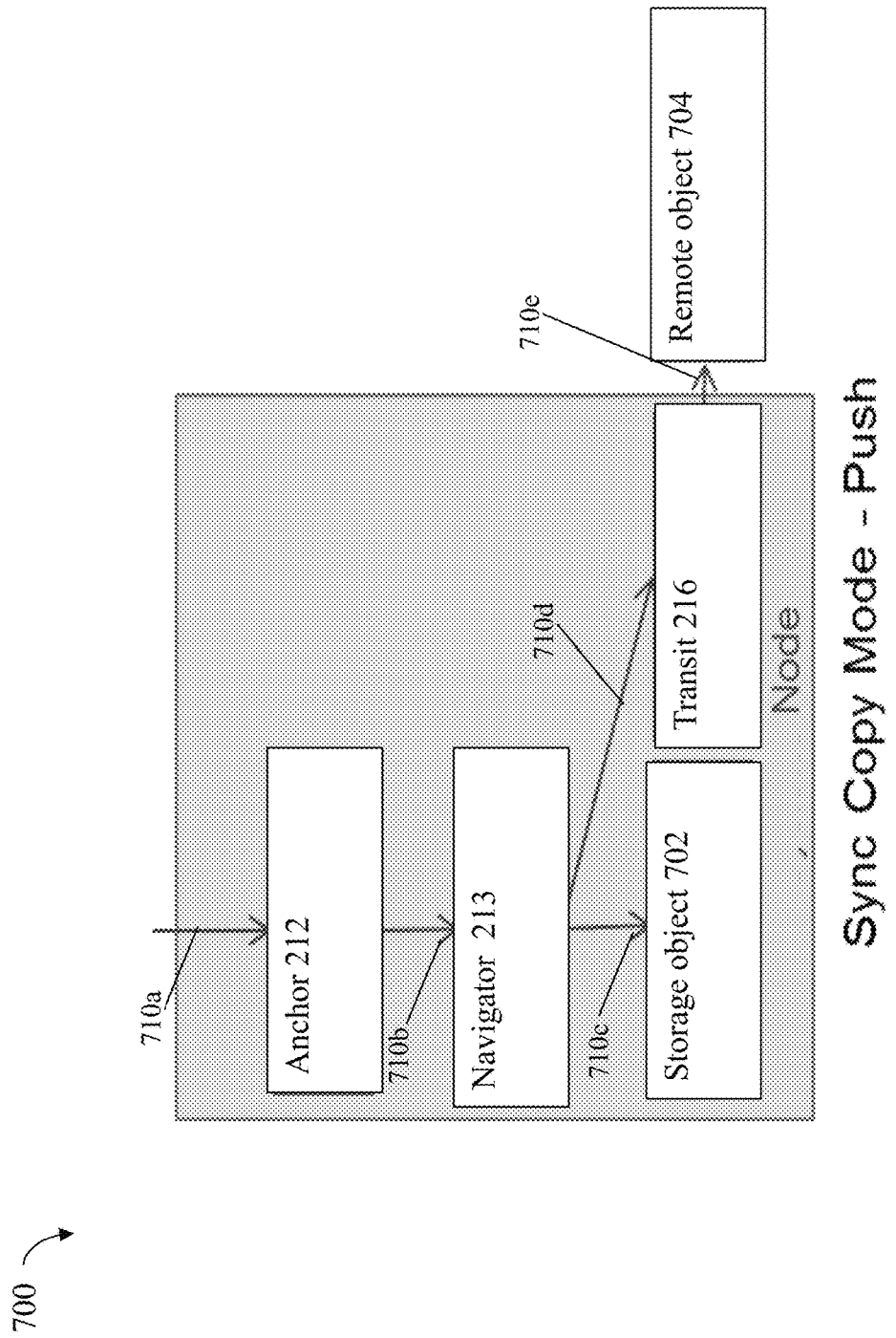

Referring to FIG. 9, shown is an example 700 illustrating use of techniques herein in connection with selected components of the layered services configured for the data service of synchronous replication using a data push model between a local storage object, such as LUN, and a remote storage object, such as a remote copy of the LUN. The example 700 includes anchor 212, navigator 213, local storage object 702, remote object 704, and transit 216. When synchronous replication is configured between a local storage object 702 and an object 704 on a remote system, navigator 213 is setup to mirror the writes made to local object 702 to the remote object 704. Additionally, navigator 213 also provides for servicing reads from the local object 702. Generally, the example 700 of FIG. 9 illustrates the synchronous copy data service as described in connection with the data path call stack 412 of FIG. 4. The example 700 includes the same components of the layered services 154a" of FIG. 4. Arrows 710a-e denote the host I/O flow as a result of read and write I/Os received from the host.

Figure 10:
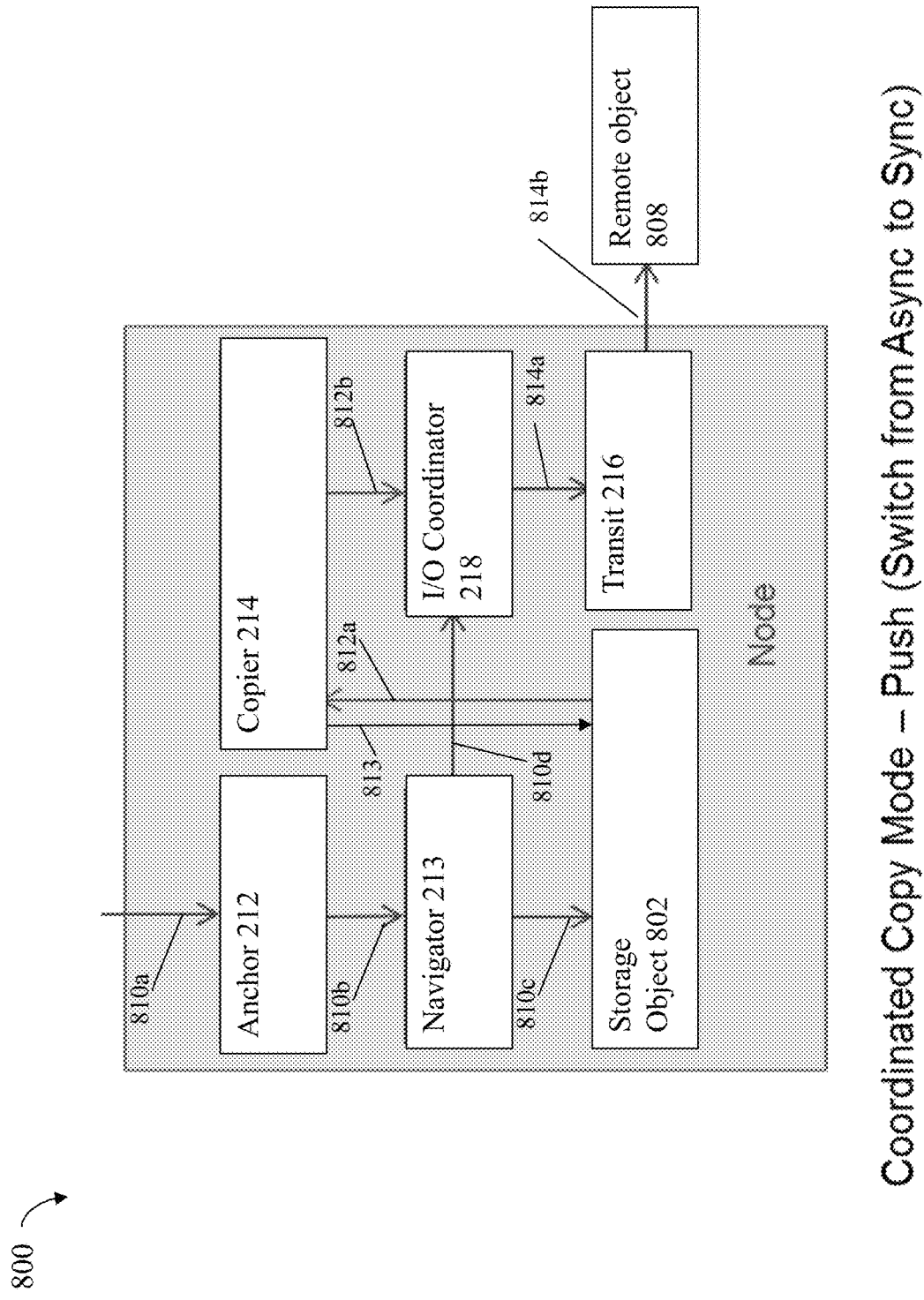

Referring to FIG. 10, shown is an example 800 illustrating use of techniques herein in connection with selected components of the layered services configured for the data service of transparent migration from a local storage object 802 to a remote storage object. One such use of migration may be to migrate a local storage object of the local system to the remote system with the intent of taking the local system offline. For example, the local system may be replaced with the remote system that is a new data storage system. The example 800 includes anchor 212, navigator 213, copier 214, local storage object 802, IOC 218, transit 216 and remote storage object 808.

For such a migration as noted above, asynchronous replication (e.g., as described in connection with FIG. 8) may be initially performed in a first phase to copy a large amount (e.g., specified threshold amount that may be less than all of the data of 802) of data from the local storage object 802 to the remote storage object 808. In the first phase, processing includes tracking which data portions stored at the particular logical addresses of the local storage object 802 have been copied or not. Subsequently in a second phase, the replication session may be switched from asynchronous to synchronous mode (e.g., as described in connection with FIGS. 4 and 9) and additionally, the remaining portion of the local storage object 802 (not previously copied in the first phase) may be copied in the background to the remote object 808. The example 800 of FIG. 10 illustrates the components of the layered services that may be configured in the data path call stack in connection with this second phase (where the remaining portion of the local storage object 802 is copied to the remote object 808 at the same time that new additional host I/Os may be received for processing. The switch from asynchronous mode to synchronous mode in this second phase may be achieved first by inserting navigator 213 to start mirroring host I/O writes to the remote object 808 of destination or remote system. An IOC 218 and copier 214 may then be inserted to perform an incremental background copy operation to copy the remaining portion of the storage object 802 not previously copied to the remote object 808 in the first phase. The IOC 218 ensures that the copier 214 will never overwrite the newly received host writes (e.g., received from the FE component after the first phase has completed/second phase commenced) being propagated by the navigator. Thus, in the second phase, the IOC 218 receives both the new second phase host I/Os (e.g., transmitted along 810a, 810b, 810c, 810d) and also copy I/Os 812b from the copier 214. The navigator 213 is configured so that host I/O reads may be serviced using the local storage object 802 and host writes may be issued along 810c and 810d. The IOC 218 ensures point in time write consistency regarding the writes applied to the remote object 808 (e.g., the IOC does not apply any write received from the copier 214 via 812b to a write destination or location (e.g., logical address) if the IOC has already applied a write received from the navigator 213 via 810d to that same write destination or location.

In the example 800, the navigator 213 is configured so that the I/Os issued 810c from navigator 213 to the local storage object 802 are primary and local; and the I/O issued 810d from navigator 213 to the IOC 218 are secondary and remote. The IOC 218 of the example 800 is configured so that the I/Os received on 810d from the navigator 213 are primary and local; and the I/Os received 812b from copier 214 are secondary and remote.

Once the remaining portion has been copied in the second phase, a third phase may be commenced whereby the background copying performed by the copier 214 may terminate. Additional processing performed in the third phase may vary with the particular use case. For example, in at least one embodiment having the goal of data migration, once the remote object 808 has been fully synchronized with the local storage object 802, the storage object may be transparently cut over to the remote system whereby only the remote storage object 808 is utilized (e.g., servicing of I/Os may be performed using solely the remote storage object 808 on the remote system and the local system may be taken off line, if desired).

Arrows 810a-d denote the host I/O flow as a result of read and write I/Os received from the host. Element 813 denotes the copy I/O flow of read I/Os issued from 214 to 802 whereby the returned read data flow is illustrated by 812a. Element 812b denotes the flow of write I/O requests and thus write data from the copier 214 to IOC 218. Elements 814a-b denote mixed I/O flow whereby the I/Os may originate from the host I/O request stream or copy I/O request stream originated by copier 214.

Figure 11:
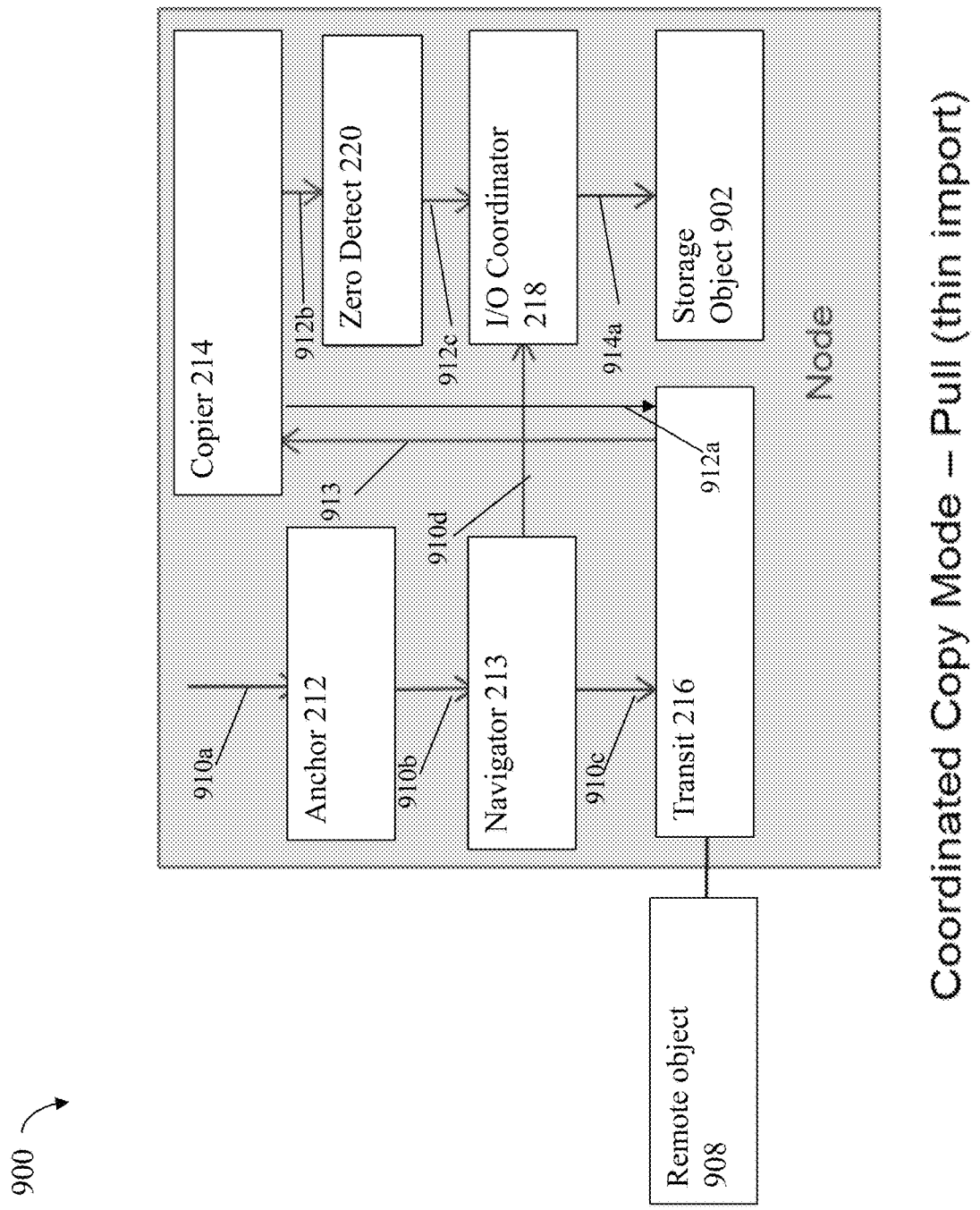

Referring to FIG. 11, shown is an example 900 illustrating use of techniques herein in connection with selected components of the layered services configured for the data service of importing data from a foreign external data storage system. The example 900 includes anchor 212, navigator 213, copier 214, local storage object 902, IOC 218, transit 216, zero detect 220 and remote storage object 908. In the example 900, a data pull technique is used where the source of the data transfer is the remote storage object 908 and the destination of the transfer is local storage object 902. The storage objects 908 and 902 may be LUNs and the local storage object 902 may be configured as a thin or virtually provisioned LUN. When importing data from remote object 908 of the foreign system, navigator 213 may be first setup between the remote object 908 and local object 902. All read requests are forwarded to the source (remote object 908), and writes are mirrored on both 908 and 902. Subsequently, a background copy may be performed by setting up copier 214, IOC 218 and zero detect 220. IOC 218 is setup such writes from navigator 213 are always treated as primary. Zero detect 220 ensures "thinness" of the local storage object 902 is maintained whereby storage is not allocated for writes of zero blocks.

Arrows 910a-d denote the host I/O flow as a result of read and write I/Os received from the host. Elements 912a-c denote copy I/O flow of I/O requests initiated by the copier 214. Element 912a denotes the copy I/O flow of read I/Os issued from 214 to 216 whereby the returned read data flow is illustrated by 913. Element 914a denotes mixed I/O flow whereby the I/Os may originate from the host I/O request stream or copy I/O request stream from copier 214.

In the example 900, the navigator 213 is configured so that the I/Os issued 910c from navigator 213 to the transit 216 (and remote storage object 908) are primary and remote; and the I/O issued 910d from navigator 213 to the IOC 218 are secondary and local. The IOC 218 of the example 900 is configured so that the I/Os received on 910d from the navigator 213 are primary and remote; and the I/Os received 912b from copier 214 are secondary and local.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of determining and using data paths comprising:
    receiving an administrative command on a control path, wherein the administrative command is a request to perform any of enable, disable and modify a data service for a first storage object;
    determining, in accordance with the administrative command, a modification to be made to a current configuration of a data path for the first storage object in order to implement the administrative command, wherein the current configuration includes a plurality of components forming a call stack invoked in connection with I/O (Input/Output) request processing for I/O requests directed to the first storage object; and
    modifying the data path in accordance with the modification determined.

2. The method of claim 1, wherein the administrative command is a request to enable the data service for the first storage object, wherein the current configuration of the data path includes only a first component of layered services, wherein the modification includes adding one or more additional components of the layered services to the data path for the first storage object to enable performing the data service for the first storage object, and wherein the one or more additional components are not included in the data path for the first storage object prior to said modifying.

3. The method of claim 1, wherein the administrative command is a request to disable the data service for the first storage object, wherein the current configuration of the data path includes a plurality of components of layered services, wherein the modification includes removing one or more of the plurality of components of the layered services from the data path for the first storage object to disable the data service for the first storage object, and wherein the one or more of the plurality of components are removed from the data path for the first storage object by said modifying.

4. The method of claim 1, wherein said determining and said modifying are performed while a host is issuing I/O requests to the first storage object.

5. The method of claim 1, wherein the data path for the first storage object is a first data path, and a second data path is used for processing I/O requests issued to a second storage object, wherein the second data path includes a plurality of components forming a second call stack invoked in connection with I/O request processing for I/O requests directed to the second storage object, and wherein the call stack of components of the first data path for the first storage object includes at least one component that is not included in the second call stack of the second data path for the second storage object.

6. The method of claim 5, wherein the first data path is customized in accordance with data services enabled for the first storage object, wherein the second data path is customized in accordance with data services enabled for the second storage object, and wherein a layered services orchestrator determines components of layered services included in the first data path for the first storage object and the second data path for the second storage object.

7. The method of claim 1, wherein the call stack of the data path for the first storage object includes one or more components selected from layered services in accordance with data services enabled for the first storage object.

8. The method of claim 7, wherein the layered services includes an anchor component that is at a top of the call stack and is first invoked in connection with processing client I/O requests directed to the first storage object, said anchor component being a required component in each data path for each storage object.

9. The method of claim 8, wherein the layered services includes a transit component that is included in the call stack and configured as a proxy for a remote storage object on a remote system, wherein said transit component receives I/O requests and translates I/O requests in accordance with format and semantics of the remote system.

10. The method of claim 8, wherein the layered services includes a navigator component that is included in the call stack and configured as a target that receives I/O requests from another component, and wherein the navigator component also is configured as an initiator of I/O requests with respect to two other components whereby the navigator component is configured to send I/O requests to the two other components.

11. The method of claim 10, wherein the navigator component forwards write I/O requests received from the another component to the two other components, wherein a first of the two other components is designated as a primary and a second of the two other components is designated as a secondary, and wherein the navigator component performs first processing for a read I/O request comprising:
    determining whether the second component designated as secondary is local with respect to the navigator component whereby the navigator component and the second component are included in a same system;
    determining whether the second component is able to provide valid requested read data of the read I/O request; and responsive to determining the second component is local and also able to provide the valid requested read data of the read I/O request, issuing the read I/O request to the second component but not the first component.

12. The method of claim 8, wherein the layered services includes a copier component that is included in the call stack and configured to issue read I/O requests to a first component and issue write I/O requests that write read data received for the read I/O requests.

13. The method of claim 8, wherein the layered services includes a I/O coordinator (IOC) component that is included in the call stack and configured to receive I/Os from two other initiator components and configured to send I/O requests to another target component.

14. The method of claim 13, wherein the IOC component forwards read I/O requests received from the two other initiator components to the another target component, wherein a first of the two other components is designated as a primary and a second of the two other components is designated as a secondary, and wherein the IOC component forwards write I/O requests received from the first component designated as primary to the another target component, and wherein the IOC component rejects write I/O requests received from the second component designated as secondary if the write I/O requests overwite any region tracked by the IOC component as having already been written in connection with write I/O requests received from the first component designated as primary.

15. The method of claim 8, wherein the layered services includes a zero detection component that is included in the call stack and configured between a single initiator component and a single target component, and wherein the zero detection component performs first processing comprising:
   determining whether a write operation is a request to write zeroes to a logical address that is not mapped to allocated storage; and
   responsive to determining the write operation writes zeros to the logical address that is not mapped to allocated storage, tracking that the logical address has zeroes impliedly stored at the logical address without allocating storage for the logical address.

16. The method of claim 1, wherein the first storage object is a first logical device, and wherein the first logical device is one of a plurality of logical devices and each of the plurality of logical devices has its own customized call stack including only selected components invoked in accordance with data services performed for said each logical device.

17. A system comprising:
   one or more processors; and
   a memory comprising code stored thereon that, when executed, performs a method of determining and using data paths comprising:
      receiving an administrative command on a control path, wherein the administrative command is a request to perform any of enable, disable and modify a data service for a first storage object;
      determining, in accordance with the administrative command, a modification to be made to a current configuration of a data path for the first storage object in order to implement the administrative command, wherein the current configuration includes a plurality of components forming a call stack invoked in connection with I/O (Input/Output) processing for I/O requests directed to the first storage object; and
      modifying the data path in accordance with the modification determined.

18. A non-transitory computer readable medium comprising code stored thereon that, when executed, performs a method of determining and using data paths comprising:
   receiving an administrative command on a control path, wherein the administrative command is a request to perform any of enable, disable and modify a data service for a first storage object;
   determining, in accordance with the administrative command, a modification to be made to a current configuration of a data path for the first storage object in order to implement the administrative command, wherein the current configuration includes a plurality of components forming a call stack invoked in connection with I/O (Input/Output) processing for I/O requests directed to the first storage object; and
   modifying the data path in accordance with the modification determined.

19. The non-transitory computer readable medium of claim 18, wherein the administrative command is a request to enable the data service for the first storage object, wherein the current configuration of the data path includes only a first component of layered services, wherein the modification includes adding one or more additional components of the layered services to the data path for the first storage object to enable performing the data service for the first storage object, and wherein the one or more additional components are not included in the data path for the first storage object prior to said modifying.

20. The non-transitory computer readable medium of claim 18, wherein the administrative command is a request to disable the data service for the first storage object, wherein the current configuration of the data path includes a plurality of components of layered services, wherein the modification includes removing one or more of the plurality of components of the layered services from the data path for the first storage object to disable the data service for the first storage object, and wherein the one or more of the plurality of components are removed from the data path for the first storage object by said modifying.

* * * * *